United States Patent [19]

Mouille

[11] Patent Number: 5,228,640
[45] Date of Patent: Jul. 20, 1993

[54] DEVICE FOR THE ELASTIC COUPLING BETWEEN TWO PARTS, AND AIRCRAFT WITH ROTATING WINGS COMPRISING SAID DEVICE

[75] Inventor: René L. Mouille, Aix-En-Provence, France

[73] Assignee: Societe Anonyme dite: Aerospatiale Societe Nationale Industrielle, Paris, France

[21] Appl. No.: 897,986

[22] Filed: Jun. 16, 1992

[30] Foreign Application Priority Data

Jun. 18, 1991 [FR] France ................. 91 07444

[51] Int. Cl.$^5$ ............... B64C 27/51; F16F 9/50
[52] U.S. Cl. ................... 244/17.27; 188/283; 188/287; 188/316; 188/380
[58] Field of Search ............ 244/17.27; 188/279, 188/280, 283, 286, 287, 311, 316, 313, 315, 379, 380; 267/225, 226; 248/557, 559; 416/500

[56] References Cited

U.S. PATENT DOCUMENTS

| | | | |
|---|---|---|---|
| 1,605,798 | 12/1993 | Van Crombrugge | 267/226 |
| 2,243,280 | 5/1941 | Kyle | 188/287 |
| 2,861,795 | 11/1958 | Blake | 267/226 |
| 3,690,607 | 9/1972 | Mard | 248/20 |
| 4,742,898 | 5/1988 | Lee | 188/267 |
| 5,040,645 | 8/1991 | Völpel et al. | 188/287 |
| 5,050,712 | 9/1991 | Heichman | 188/287 |

FOREIGN PATENT DOCUMENTS 0335786 10/1989 European Pat. Off. .
2629545 10/1989 France .

Primary Examiner—Joseph F. Peters, Jr.
Assistant Examiner—Virna Lissi Ansley
Attorney, Agent, or Firm—Marshall, O'Toole, Gerstein, Murray & Borun

[57] ABSTRACT

A device for elastic coupling between two parts, especially the principal transmission box and the fuselage of an aircraft with rotating wings, such as a helicopter, includes first and second inner and outer tubular bodies, and an elastic connection, housed in the annular space existing between the first and second bodies and coupling the first and second bodies in a leaktight fashion. The annular space is separated by the elastic connection into first and second chambers filled with a liquid, the first and second chambers being in communication with the inside of the first body. On the inside of said first body, there is a liquid distributor provided with an elastic damping connection and including two pistons, which are coupled by a piston rod and separated from each other by the distance separating orifices in the first and second chambers.

12 Claims, 5 Drawing Sheets

DEVICE FOR THE ELASTIC COUPLING BETWEEN TWO PARTS, AND AIRCRAFT WITH ROTATING WINGS COMPRISING SAID DEVICE

BACKGROUND OF THE INVENTION

The present invention relates to a device for elastic coupling between two parts in order to transmit from one to the other the static forces in the axis of the device and to simultaneously filter the associated coaxial vibratory excitations which are transmitted from one to the other.

More particularly, although not exclusively, such a device can be used in the suspension coupling the principal transmission box to the fuselage of an aircraft with rotating wings, such as a helicopter, in order to filter the vibrations engendered by the rotor and transmitted to the fuselage of said aircraft by said transmission box.

In fact, one of the fundamental problems of the helicopter arises from the general level of vibration which determines, on the one hand, the level of alternating strains in the entire machine (and consequently the resistance to fatigue and as a result the service life of the parts) and, on the other hand, the comfort in the cabin and the vibration of the controls.

DESCRIPTION OF THE PRIOR ART

The subject of much research has thus been to attenuate, if not to completely eliminate, this level of vibration which is inherent to the very operation of the rotor which not only transmits to the hub the static or quasi-static forces and moments created by:

the lift (perpendicular to the plane of the rotor),
the drag (parallel to the horizontal speed $V_H$ of the machine),
the drift force (perpendicular to the two preceding forces) which remains almost zero, but also the periodic forces and moments originating from aerodynamic dissymmetries (lift and drag of the profile) which appear during the rotation of the blades, essentially due to $V_H$ in translational flight at high speed, or even dissymmetries resulting from the unequal distribution of speeds induced on the disk of the rotor at low speed (transition zone). These alternating aerodynamic forces and moments are transmitted to the center of the rotor after having been attenuated or amplified by the blades.

By designating, in a general fashion, by $\Omega$ the rotational speed of the rotor and by b the number of blades, it is recalled that:

the forces (due to the beating movements of the blades) and the moments (due to the drag movements of the blades) the axes of which are borne by the axis of the rotor, are only transmitted to the mast and to the fuselage if their frequency is as $kb\Omega$ (k: positive integer, equal to or greater than 1), the transfer of these forces and moments of the rotating axes to the fixed axes being carried out without changing the frequency (effects of pumping and of torsion in the structure);

the forces (due to the drag movements of the blades) and the moments (due to the beating movements of the blades) whose axes are in the plane of the rotor, are only transmitted to the mast and to the fuselage if their frequency is a harmonic of $(kb\pm 1)\Omega$, the resultant forces and moments being thus at the frequency $kb\Omega$ in fixed axes (effects of roll and pitch, transverse or longitudinal swaying, principally in $b\Omega$).

Consequently, it will be recalled that a balanced rotor only transmits, other than static forces and moments, forces and moments which alternate at a frequency which is a multiple of the speed of the rotor multiplied by the number of blades, the fundamental frequency being equal to $b\Omega$.

Thus, it would be expedient, in order to avoid dangerous periodic forces of a frequency which is a multiple of the speed of the rotor, to increase the number of blades because:

the excitation harmonics at the level of the blades affecting the vibrations in the fuselage are distributed according to the following order:

| | | | | | | | | | | | |
|---|---|---|---|---|---|---|---|---|---|---|---|
| two blades | 1 | 2 | 3 | 4 | 5 | 6 | 7 | 8 | 9 | 10 | 11 |
| three blades | | 2 | 3 | 4 | 5 | 6 | 7 | 8 | 9 | 10 | 11 |
| four blades | | | 3 | 4 | 5 | | 7 | 8 | 9 | | | 11 |
| five blades | | | | 4 | 5 | 6 | | | | 9 | 10 | 11 | the amplitude of the harmonics is all the more weak when their order is higher;
the excitations affecting the comfort are the harmonics $(kb \pm 1)\Omega$ in the axes of the blades;
the lower the excitation frequency, the more sensitive a person becomes, and especially in the vertical axis.

For reasons of cost and of complexity, it is nevertheless expedient to limit the number of blades.

Moreover, it is well known that as the performance increases, the excitations increase as $V_H^n$ ($n > 1$): at high speed, the vibration level in the fuselage increases in the same manner.

These remarks, complemented by the evidence of more and more significant comfort requirements, justify the devising of systems which are capable of transmitting the static forces and moments designated by $F_O$ whilst attenuating the vibrations, corresponding to the decomposition into a Fourier series $\Sigma F_n \cos n\Omega t$ (t: time, n: order of harmonics). This attenuation must especially stretch to minimizing the vertical components of the dynamic stresses at the level of the fuselage, which prove to be the most troublesome in practice.

In order to diminish these vibrations, a certain number of means of action are available.

The rotor being the initial generator of alternating forces and moments, the first means consist in designing the blades in such a way that the forces applied (in the broadest sense of the term) should be compensated by the inertia forces (the optimization of the distribution of mass, especially of stiffness): there is thus an attenuation of the transmission of forces to the hub.

After the optimization of the blades, there still remains a dynamic wrenching action at the head of the rotor, composed of three orthogonal forces and three moments which are also orthogonal.

Specific means must thus be provided to minimize the coefficient of transmissibility (the ratio of the amplitude of the forces or moments transmitted to the fuselage to that of the forces or moments applied at the head of the rotor), which in some way characterizes the effectiveness of these means: this concerns means of actively controlling the rotor or the structure, and passive control means (antivibrators or resonators).

As a reminder, the active control of the rotor occurs essentially in accordance with a multicyclical control law of the rotor, realized either at the level of the pitch control, or by setting a flap at the end of the blades in motion, in such a fashion as to bring the vibrational level of the helicopter below a chosen threshold.

The principle for the active control of the structure is to produce a wrenching action, which is controlled and antagonistic to the disturbing wrenching action of the rotor, which minimizes or cancels out the vibrations in one part of the structure. The applications implement, for example, a bar equipped with a servo-assisted ram, or even a device with, between the principal transmission box and the fuselage, links which are guided axially as a function of the forces produced and detected on the structure in order to attenuate the vibrations, as is taught for example in the patent FR-2,566,862.

The passive control means are much more numerous than the aforementioned means, taking into account an acceptable effectiveness and a relative ease of being carried out and integrated, especially on helicopters. Their object is to filter the vibrations between the mechanical assemblies of the principal rotor and the fuselage.

Thus, the patent FR-2,499,505 describes such a passive control device, integrated in the suspension which couples the principal transmission box and the fuselage of a helicopter. The suspension described in the above-mentioned document comprises, on the one hand, a membrane for taking up the reaction to the engine couple, which is flexible in the axial direction and rigid in the radial direction, arranged under the principal transmission box at the level of the upper structure of the fuselage and, on the other hand, bars for transmitting the forces, emanating from the rotor, and resonators with unidirectional action, situated in a plane which is parallel to the fuselage. Each resonator exhibits, as is usual, two functions: a "stiffness" function and an "antiresonance" function. In this case, the stiffness function is assured by a flexible strip coupled, on the one hand, to the fuselage and, on the other hand, to the bottom of the principal transmission box. Moreover, each bar is coupled to the respective strip at the free end of the latter, outside the aforementioned bearing points of the strip. The antiresonance function is assured, as far as it is concerned, by a mass arranged on one end of a lever arm the other end of which is coupled to the flexible strip.

However, the existence of such a lever arm implies, for a mechanical amplification device of this type, a significant bulk, which restrains the possible amplification whilst remaining within reasonable limits, either of bulk or of mass.

In order to overcome this drawback, a device using a "liquid lever" is known, in which a liquid of low viscosity acts as a stroke-increasing lever on a shaft and a mass which are solidly fixed to a spring. More precisely, a device of this type, described in the patent FR-2,629,545, comprises an external cylinder solidly fixed to the fuselage of an aircraft with rotating wings, at its lower end, and an internal cylinder which is solidly fixed, at its upper end, to the principal transmission box, an elastomeric bearing between the two cylinders assuring the function of stiffness. The central part of the inner cylinder and two hollow shafts serve as guidance for a mass, mounted so as to slide on said shafts, and are filled with oil of low viscosity. The variation in the volume of the chambers situated at the ends of the inner cylinder brings about the displacement of the mass with a stroke which is amplified, thus allowing the function of antiresonance to be assured. However, such a device for hydraulically amplifying the stroke is not free from drawbacks either. In fact, there is a risk of leakage of the low viscosity oil, whilst a fully topped up oil system is difficult to obtain without a bleed system. Other difficulties connected with the use of a liquid such as oil could be cited: expansion freezing. Furthermore, there exists, in this case, the risk of a momentary absence of filtering upon the application of transitory static forces (where the beating mass comes against its stop).

SUMMARY OF THE INVENTION

The object of the present invention is to overcome the drawbacks of the passive control devices, especially those disclosed in the patents FR-2,499,505 and FR-2,629,545, and relates to a device for elastic coupling between two parts, whose structure, although exhibiting certain similarities with the "liquid lever" device described latterly, does not have a beating mass, the device of the invention not necessitating, moreover, the use of low viscosity oil.

In order to achieve this, the device for elastic coupling between two parts in order to transmit from one to the other the static forces in the axis of the device and to filter the coaxial vibrations between the first and the second part, of the type comprising:

a first, inner tubular body capable of being coupled to the first part, a second, outer tubular body, coaxial with said first body, and capable of being coupled to the second part, means for elastic return in the axial direction, housed in the annular space existing between said first and second bodies and coupling in a leaktight fashion said first and second bodies, is noteworthy, according to the invention, in that:

said annular space is separated, by said elastic return means, into first and second chambers filled with a liquid, said first and second chambers are in communication, respectively, by at least one first orifice and at least one second orifice made in said first body, with the inside of the latter, on the inside of said first body there is provided a distributor of liquid comprising two pistons for which the inner wall of said first body acts as a cylinder, which are coupled by a piston rod and separated one from the other by the distance 1 separating said first and second orifices, and the volume of which defined between them can be supplied with liquid, and elastic return means and damping means of said distributor are provided, the arrangement of the aforementioned elements being such that, when the device is in the neutral position or is subjected to static or quasi-static forces, said pistons completely block said orifices, the movements of the inner cylindrical body and of the distributor being in the latter case concomitant, and such that, when the device is subjected to vibrations, the pistons unblock, at least partially, one or other of said orifices in such a fashion as to supply liquid to the corresponding chamber.

Thus, in the static state, a suspension which is sufficiently stiff is obtained, whose only effect is to produce a limited movement during the phase where the various elements of the device are set in motion, whilst, under the action of alternating forces, the device allows the suspension to be made flexible by virtue of an autoadaptable hydraulic activation, as will be explained in more detail hereinbelow. Moreover, the device of the invention allows the use of a conventional hydraulic fluid (for example of the type used in servo-systems). Because of this, the risk of leaks is lessened. The absence of the oscillating mass makes the momentary failure to filter during the application of transitory static forces impossible.

According to a first embodiment of the invention, said elastic return means between said first and second bodies comprise an annular separation wall which is solidly fixed to the outer face of the first, inner tubular body and presses in a leaktight fashion on the inner face of the second, outer tubular body, and two helical springs, extending parallel to the axis X—X of the device, housed, respectively, in the first and second chambers, and each pressing on said separation wall and the end face, opposite said wall, of the respective chamber.

According to a second embodiment of the invention, said elastic return means between the first and second bodies are constituted by a ring of relatively flexible synthetic material, solidly attached to the outer face of the first, inner tubular body and to the inner face of the second, outer tubular body. Said ring can in particular be made of elastomer.

Advantageously, the piston rod is hollow, and an orifice, in the wall of the latter, puts in communication the inside of the rod and the volume defined between the pistons and the latter, whilst, at the opposite end to the pistons, said rod is in communication with a device for supplying liquid under pressure.

According to other characteristics of the invention, the first and second chambers are in communication, respectively, by first and second drillings, made in the wall of the second, outer tubular body, with a bleed system, by the intermediary of the first and second conduits, whilst orifices for the evacuation of liquid are provided in said first and second tubular bodies, outside the zone of said first and second chambers.

Moreover, the elastic return means of the distributor can be constituted by two helical springs, housed in the first, inner tubular body, acting on either side, respectively, of the assembly formed by the two pistons of the distributor.

Preferably, the damping means of the distributor comprise a piston borne by the piston rod of the distributor in the vicinity of the end of the latter opposite the pistons of the distributor, and capable of moving in a cylinder the two chambers of which, delimited by said piston, are coupled by a conduit of calibrated fixed or, as a variation, adjustable cross-section, particularly using a needle valve.

BRIEF DESCRIPTION OF THE DRAWINGS

The figures of the appended drawings will allow the means by which the invention can be carried out to be clearly understood.

DESCRIPTION OF THE PREFERRED EMBODIMENTS

Figure 1:
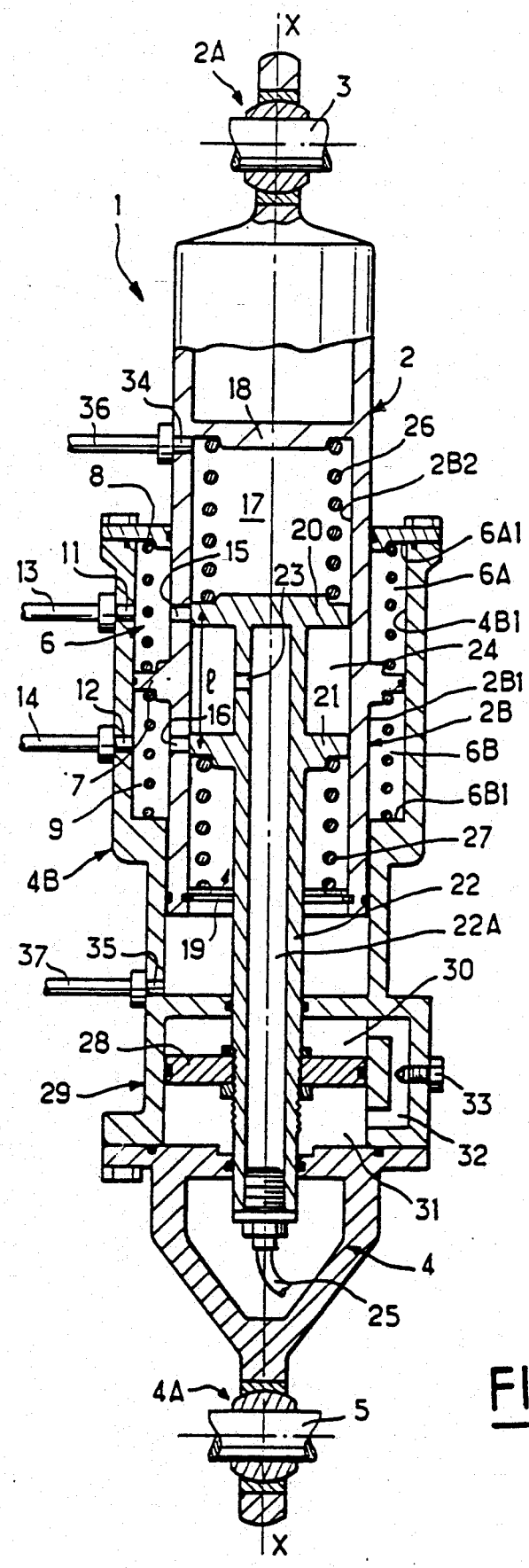
FIG. 1 is a longitudinal section of a first embodiment of the device of the invention.

As seen in FIG. 1, the device 1 comprises a first, inner tubular body 2 which is able to be coupled, at one end 2A, to a first part 3 (of which part only the coupling axis is illustrated in FIG. 1), and a second, outer tubular body 4, coaxial with said first body 2, and capable of being coupled to the second part 5 (of which part, in the same way, only the coupling axis is illustrated in FIG. 1). Moreover, the end part 4B opposite the end 4A of the second body 4 surrounds the end part 2B opposite the end 2A of the first body 2, thus making, between the end parts 4B and 2B, an annular space 6 separated into first 6A and second 6B leaktight chambers by the elastic return means in the axial direction, coupling, in a leaktight fashion, the first 2 and second 4 bodies. In the embodiment shown in FIG. 1, these elastic return means comprise an annular separation wall 7 which is solidly attached to the outer face 2B1 of the end part 2B of the body 2 and presses against, in a leaktight fashion, the internal face 4B1 of the end part 4B of the body 4 to form a piston, and two axial helical springs 8,9 housed, respectively, in the chambers 6A and 6B and each pressing against the separation wall 7 and the end face 6A1 or 6B1 of the chamber 6A or 6B.

Figure 5:
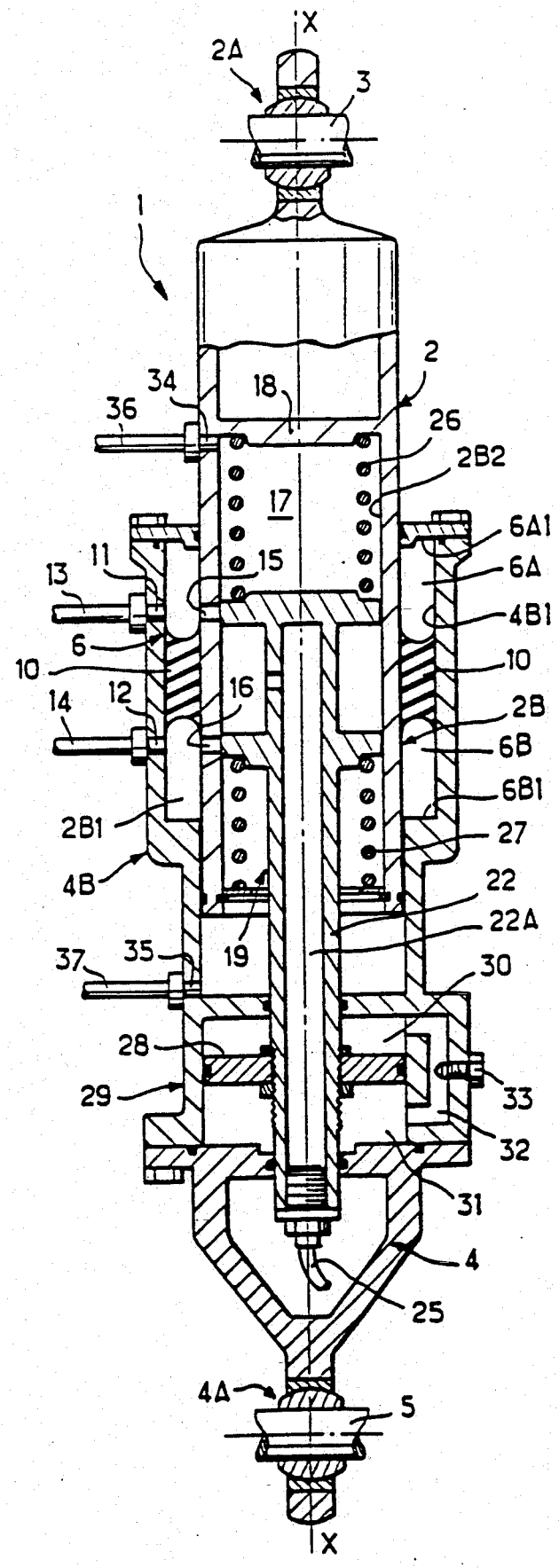
FIG. 5 is a longitudinal section of a second embodiment of the device of the invention.

In the embodiment shown in FIG. 5, which is otherwise identical to the embodiment of FIG. 1, the elastic return means are constituted by a ring 10 of relatively flexible synthetic material, especially an elastomer, solidly attached to the outer face 2B1 of the end part 2B of the body 2 and to the inner face 4B1 of the end part 4B of the body 4.

The chambers 6A and 6B are filled with liquid (normal hydraulic fluid), and are, on the one hand, in communication, respectively, via a first drilling 11 and a second drilling 12 made in the wall of the end part 4B of the second body 4 with a bleed system (not shown), via the intermediary of respective conduits 13 and 14. On the other hand, the first 6A and second 6B chambers are in communication, respectively, by at least one first orifice 15 and at least one second orifice 16, made in the wall of the end part 2B of the first body 2, with the inside 17 of the latter, which is limited, on the side of the end 2A, by a transverse wall 18, and open at its other end.

On the inside 17 of the first body 2 there is provided a distributor 19 of liquid comprising two pistons 20,21 for which the inner wall 2B2 of the first body 2 acts as a cylinder, coupled by a piston rod 22 parallel to the longitudinal axis X—X of the device 1, and separated one from the other by the distance 1 separating said first 15 and second 16 orifices, the thickness of the pistons 20,21 substantially corresponding, moreover, to the diameter of the said orifices. Furthermore, the piston rod 22 is hollow, and an orifice 23, in the wall of the latter, puts in communication the inside 22A of the rod 22 and the volume 24 defined between the pistons 20,21 and the latter. At the opposite end to the pistons 20,21, the rod 22 is in communication with a device for supplying liquid (hydraulic fluid), a device which is not shown.

Moreover, the distributor 19 is associated with elastic return means, constituted by two helical springs 26,27 pressing, in the case of the first one 26, on the wall 18 and the piston 20, in its most extreme position on the rod 22, and, in the case of the second one 27, on the piston 21 and at the base of the body 2, and the distributor 19 is associated with damping means comprising a piston 28, borne by the rod 22 in the neighborhood of its end opposite the pistons 20,21, and capable of moving in a cylinder 29 which is full of hydraulic fluid, the two chambers 30,31 of which cylinder are coupled by a conduit 32, on the outside of the cylinder, whose cross-section can be of fixed calibration or, as a variation, controlled by a needle valve 33.

Two orifices 34 and 35 are provided, respectively, in the wall of the bodies 2 and 4 in the "bottom" of the inside of said bodies, and allow, via respective conduits 36 and 37, the hydraulic fluid to be evacuated, as explained hereinbelow.

Figure 2:
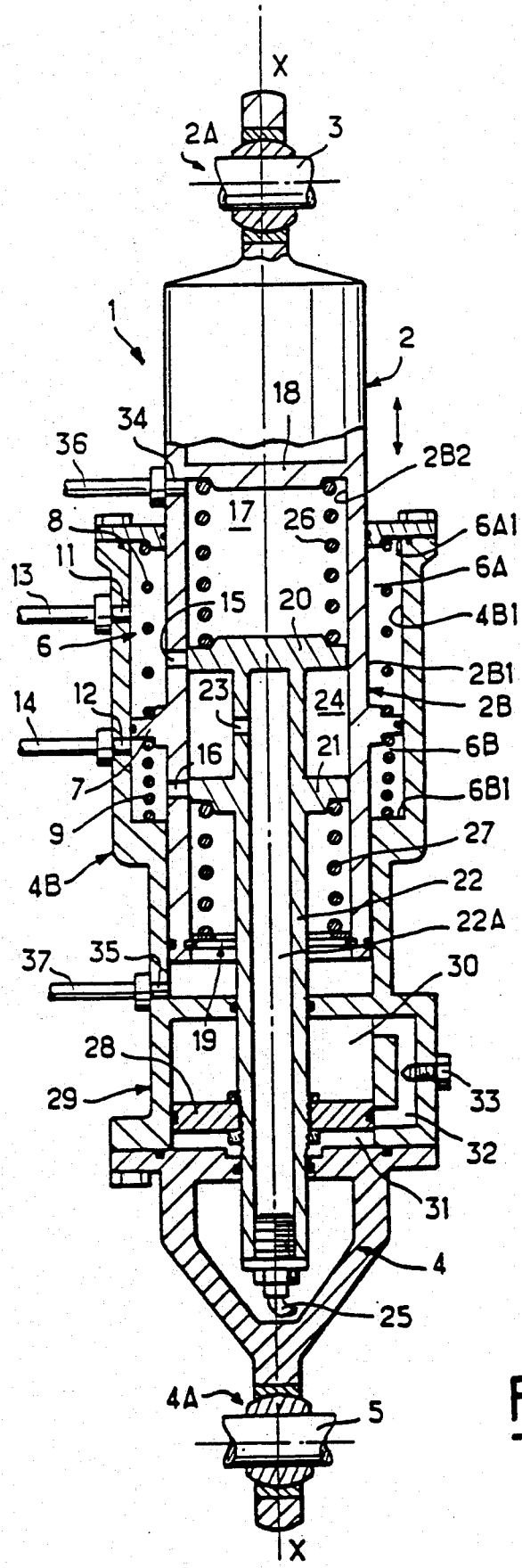
FIGS. 2 and 3 illustrate two phases of the operation of the device of FIG. 1.
Figure 3:
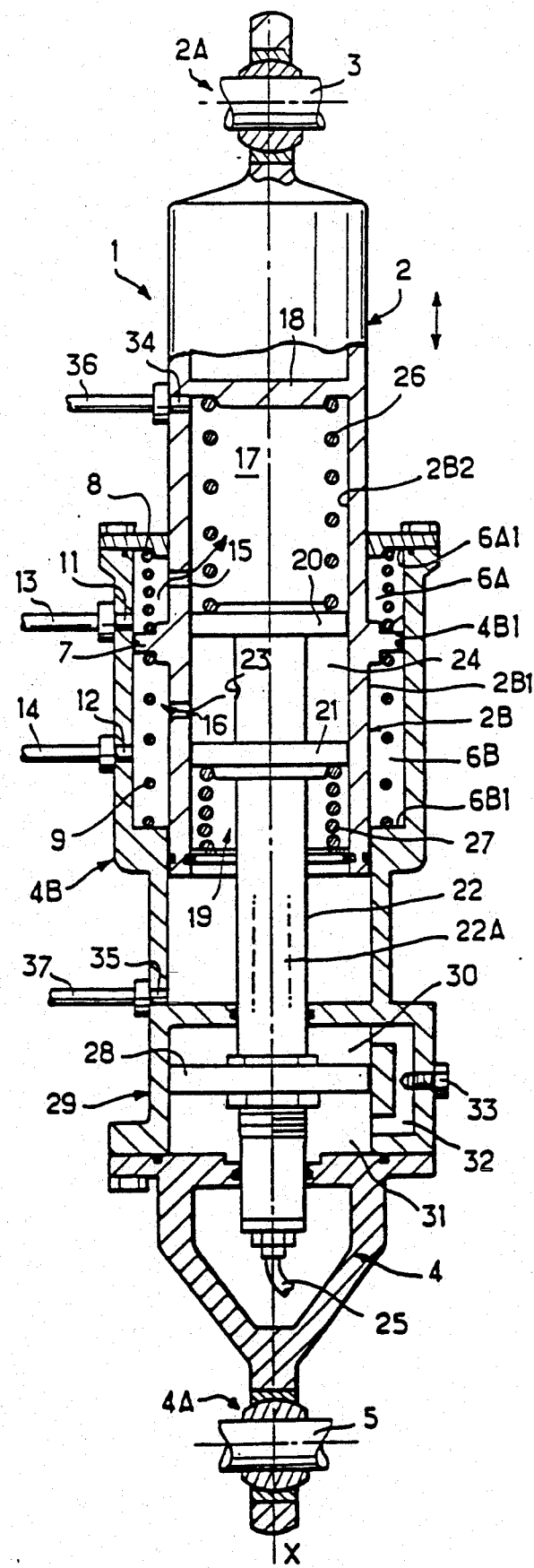
Figure 6:
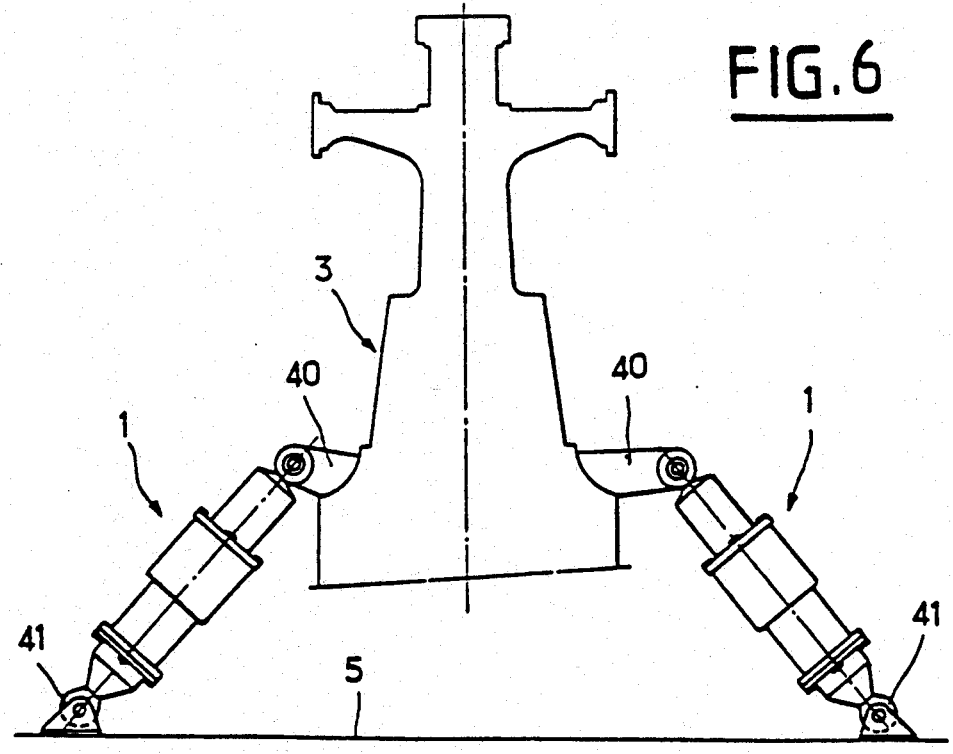
FIG. 6 demonstrates the application of the device of the invention to the suspension of the principal transmission box of a helicopter.

The operation of the device according to the invention is described hereinbelow with reference to FIGS. 2 and 3, and for the specific application to the suspension of the principal transmission box of a helicopter, illustrated by FIG. 6.

In this case, each device 1 is arranged between the principal transmission box 3 of a helicopter and the fuselage 5 of the latter, and three identical such devices (or more) can be provided to transmit the static forces and moments between the principal transmission box and the structure of the fuselage and to filter the dynamic excitations engendered by the lift and propulsion rotor of the helicopter. Each device 1 is fixed to the principal transmission box 3 and to the fuselage 5 by the intermediary of respective eye-joints 40 and 41.

Recalling that the external stresses, at the level of the head of the rotor, induce in the device (axially) a global force of the form:

$$F = F_0 + \Sigma F_n \cos n\Omega t$$

the device of the invention is designed to transmit the static (or average) force $F_0$ almost integrally to the fuselage to assure the balance of the helicopter, and to filter as effectively as possible the alternating forces $\Sigma F_n \cos n\Omega t$.

Consequently, it involves, in the first instance, a suspension which is sufficiently stiff in the static state for the relative movements between the principal transmission box and the structure to remain "reasonable". This function is assured by one of the springs, 8 or 9 (according to the direction of the external force), which are stiff and antagonistic, in such a way that the transmission of a change in the static or quasi-static force is made by the intermediary of the bodies 2 and 4, whose relative movement remains small. At the same time, the distributor 19 is entrained by the body 2 and the spring 26 or 27 tending to compress and by the damping means 28,29, and thus has practically no relative movement with relation to the body 2 (the loading being slow and progressive), and consequently does not uncover the orifices 15 and 16: the only effect is thus to produce a damping during the phase where the various elements are set in motion when the change in static load is applied (FIG. 2).

Figure 4:
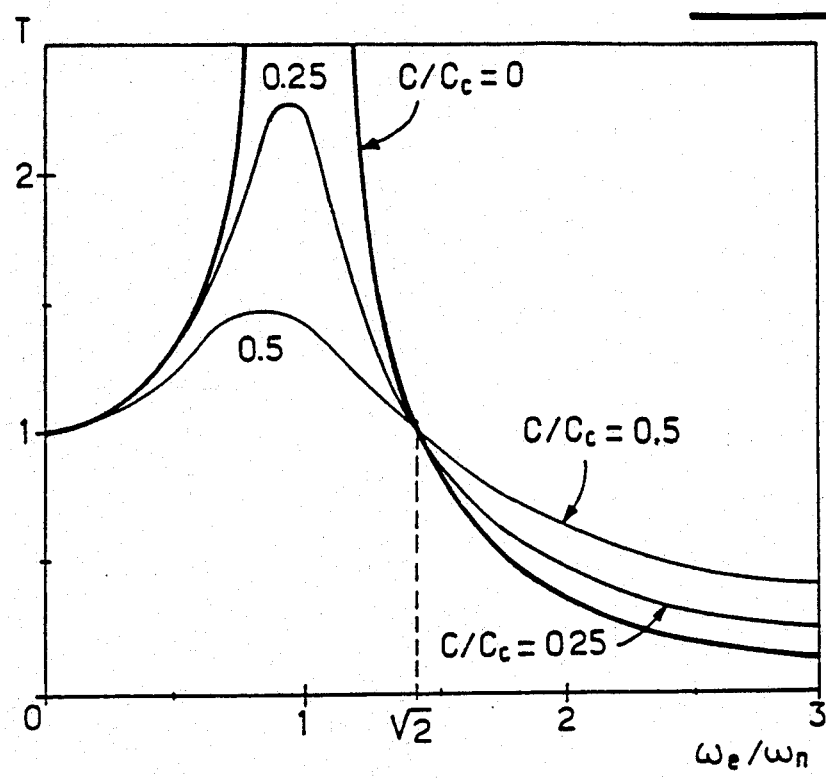
FIG. 4 shows the evolution of the coefficient of transmissibility as a function of the reduced pulsation, for different values of relative damping.

It is proved that the device behaves rather like a second order system with elastic return and damping. If $\omega_e$ designates the pulsation of the excitation and $\omega_n$ that of the device, FIG. 4 illustrates the evolution of the coefficient of transmissibility T as a function of the reduced pulsation $\omega_e/\omega_n$ and for different values of the relative damping $c/c_c$. As $\omega_e$ is low (the static force varying slowly) and $\omega_n$ is large (significant stiffness), the functional points correspond to a range of values of the ratio $\omega_e/\omega_n$ which are markedly less than unity, thus avoiding any risk of being set in resonance. An examination of FIG. 4 shows that it is concerned precisely with a range where the damping favorably diminishes the transmissibility.

FIG. 4 also indicates that the damping becomes unfavorable for $\omega_e/\omega_n > \sqrt{2}$ and that above this value, if $\omega_e/\omega_n$ increases, the result is that $\omega_n$ decreases for a given excitation pulsation $\omega_e$: the suspension is then softened and at the same time the transmissibility diminishes advantageously.

It will be noted nevertheless that the range close to $\omega_e/\omega_n = \sqrt{2}$ can correspond to a second possibility of quasi-integral transmission of static forces which evolve moderately as a function of time, in such a way that the natural frequency $\omega_n$ of the device and consequently its stiffness remain moderate. Such a functional point implies a suspension which is less stiff than previously for the transmission of transitory static forces, and all the more so when a possible partial filtration of the evolution of these forces is envisaged (an operating point relating to a coefficient of transmissibility which is slightly less than unity, thus having a ratio $\omega_e/\omega_n$ greater than $\sqrt{2}$).

A suspension which is adjusted in this way remains too stiff under the action of dynamic stresses such as those engendered by a rotor of a helicopter, for example: a more significant softening is desirable in the dynamic state to also minimize the corresponding coefficient of transmissibility.

Conjointly with the transmission of static forces, the proposed device fulfills this second function of softening the suspension whilst under the action of alternating forces (FIG. 3), the fundamental excitation pulsation $\omega_e$ of which forces is equal to $b\Omega$, as explained previously. This action is carried out by means of an auto-adaptable hydraulic activation, requiring no electronic systems, nor any computer, and at very low damping.

In this case, the piston 28 of the damping system is in virtually a fixed position, because the dynamic force is exerted at a frequency which is too high to permit a significant transfer of oil across the nozzle of the channel 32, and the distributor 19 is thus fixed with relation to the body 4. The dynamic force will simply permit a small relative movement between the bodies 2 and 4, taking into account the significant stiffness of the springs 8 and 9: there is thus an opening, to a greater or lesser extent, of the orifices 15 and 16, which has the effect, for example if the spring 8 is compressed and the spring 9 relaxed, of pressurizing the chamber 6B by the intermediary of the orifices 23 and 16 (arrow), whilst putting the chamber 6A to the tank by the intermediary of the orifices 15 and 34 (arrow): the pressure exerted on the piston 7 on the side of the chamber 6B, without counterpressure on its opposite face, continues to entrain the piston 7 and, consequently, the body 2 in the direction of the force exerted; the relative movement between the bodies 2 and 4 is thus very effectively amplified by the hydraulic assistance: the suspension has been softened in a very significant fashion and manifestly with a damping which is reduced to the minimum, that is to say favorably according to FIG. 4, with $\omega_n$ being low, $b\Omega/\omega_n$ can be adjusted to a higher level.

It will be noted that the operation of the alternative embodiment of FIG. 5 is completely comparable to that of the embodiment of FIG. 1, which has just been described.

I claim:

1. A device for elastic coupling between two parts in order to transmit static forces from one to the other and to filter coaxial vibrations between the first and the second parts, said device having a longitudinal axis and comprising:
   a first, inner tubular body capable of being coupled to the first part,
   a second, outer tubular body, coaxial with said first body, and capable of being coupled to the second part,
   means for elastic return in the axial direction, housed in an annular space existing between said first and second bodies and coupling in a leaktight fashion said first and second bodies, wherein:
   said annular space is separated, by said elastic return means, into first and second chambers filled with a liquid,
   said first and second chambers are in communication, with the inside of said first body through spaced first and second orifices, respectively, in said first body,
   on the inside of said first body there is provided a distributor of liquid comprising two pistons for which the inner wall of said first body acts as a cylinder, which are coupled by a piston rod and separated from each other by a distance equal to the distance separating said first and second orifices, and the volume of which defined between them can be supplied with liquid, and
   elastic return means and damping means are provided in said distributor, the arrangement of the aforementioned elements being such that, when the device is in the neutral position or is subjected to static or quasi-static forces, said pistons completely block said orifices, the movements of the inner cylindrical body and of the distributor being in the latter case concomitant, and such that, when the device is subjected to vibrations, the pistons unblock, at least partially, one or the other of said orifices in such a fashion as to supply liquid to the corresponding chamber.

2. The device as claimed in claim 1,
   wherein said elastic return means between the first and second bodies comprise an annular separation wall which is solidly fixed to the outer face of the first, inner tubular body and presses in a leaktight fashion on the inner face of the second, outer tubular body, and two helical springs, extending parallel to said axis of the device, housed, respectively, in the first and second chambers, and each pressing on said separation wall and the end face, opposite said wall, of the respective chamber.

3. The device as claimed in claim 1,
   wherein said elastic return means between the first and second bodies are constituted by a ring of relatively flexible synthetic material, solidly attached to the outer face of the first, inner tubular body and to the inner face of the second, outer tubular body.

4. The device as claimed in claim 3,
   wherein said ring is made of elastomer.

5. The device as claimed in claim 1,
   wherein the piston rod is hollow, and an orifice, in the wall of the latter, puts in communication the inside of the rod and the volume defined between the pistons and the latter, whilst, at the opposite end to the pistons, said rod is in communication with a device for supplying liquid.

6. The device as claimed in claim 1,
   wherein the first and second chambers are in communication, respectively, by first and second drillings, made in the wall of the second, outer tubular body, with a bleed system, by the intermediary of the first and second conduits.

7. The device as claimed in claim 1,
   wherein orifices for the evacuation of liquid are provided in said first and second tubular bodies, outside the zone of said first and second chambers.

8. The device as claimed in claim 1,
   wherein the elastic return means of the distributor are constituted by two helical springs, housed in the first, inner tubular body, acting on either side, respectively, of the assembly formed by the two pistons of the distributor.

9. The device as claimed in claim 1, wherein the damping means of the distributor comprise a piston borne by the piston rod of the distributor in the vicinity of the end of said piston rod opposite the pistons of the distributor, said pistons being capable of moving in a cylinder having two chambers delimited by said piston, said chamber being coupled by a conduit of calibrated fixed cross-section.

10. The device as claimed in claim 1,
    wherein the damping means of the distributor comprise a piston borne by the piston rod of the distributor in the vicinity of the end of the latter opposite the pistons of the distributor, and capable of moving in a cylinder the two chambers of which, delimited by said piston, are coupled by a conduit of adjustable cross-section.

11. The device as claimed in claim 10,
    wherein the cross section of said conduit is controlled by a needle valve.

12. Aircraft with rotating wings comprising a principal lift rotor driven by a principal transmission box for the motive power which supports a fuselage by the intermediary of oblique coupling bars,
    wherein each coupling bar between said transmission box and said fuselage comprises a device for elastic coupling as claimed in claim 1.

* * * * *